United States Patent
Buckner

(10) Patent No.: US 9,593,457 B2
(45) Date of Patent: Mar. 14, 2017

(54) METHOD AND SYSTEM TO MANUFACTURE NATIVE SOIL FLOWABLE FILL

(71) Applicant: VAC-TRON EQUIPMENT, LLC, Aurora, CO (US)

(72) Inventor: Don M. Buckner, Okahumpka, FL (US)

(73) Assignee: VAC-TRON EQUIPMENT, LLC, Okahumpka, FL (US)

( * ) Notice: Subject to any disclaimer, the term of this patent is extended or adjusted under 35 U.S.C. 154(b) by 0 days.

(21) Appl. No.: 14/817,354

(22) Filed: Aug. 4, 2015

(65) Prior Publication Data
US 2016/0032549 A1 Feb. 4, 2016

Related U.S. Application Data

(60) Provisional application No. 62/032,753, filed on Aug. 4, 2014.

(51) Int. Cl.
| | | |
|---|---|---|
| *E02D 3/00* | (2006.01) |
| *E02F 3/92* | (2006.01) |
| *C09K 17/08* | (2006.01) |
| *C09K 17/10* | (2006.01) |
| *E02D 15/04* | (2006.01) |
| *E02D 5/36* | (2006.01) |
| *C09K 17/00* | (2006.01) |

(Continued)

(52) U.S. Cl.
CPC .............. *E02D 5/36* (2013.01); *B01F 3/1221* (2013.01); *B01F 7/003* (2013.01); *B01F 7/00633* (2013.01); *B01F 7/20* (2013.01); *B01F 15/00428* (2013.01); *C04B 28/02* (2013.01); *C09K 17/00* (2013.01); *E02D 15/04* (2013.01); *C04B 2111/00663* (2013.01); *C04B 2111/00706* (2013.01); *E02D 3/00* (2013.01); *E02D 3/12* (2013.01)

(58) Field of Classification Search
CPC ....... B09C 1/02; B09C 2101/00; E02D 3/005; E02F 3/925; C09K 17/00; C09K 17/08; C09K 17/10
See application file for complete search history.

(56) References Cited

U.S. PATENT DOCUMENTS

| | | | | |
|---|---|---|---|---|
| 4,050,258 A | * | 9/1977 | Brewer | E02D 17/18 405/258.1 |
| 4,050,261 A | * | 9/1977 | Brewer | C04B 18/08 106/709 |

(Continued)

FOREIGN PATENT DOCUMENTS

| | | | |
|---|---|---|---|
| JP | H11-158913 A | | 6/1999 |
| KR | 2003024345 | * | 3/2003 |

*Primary Examiner* — Frederick L Lagman
(74) *Attorney, Agent, or Firm* — Matthew G. McKinney, Esq.; Allen, Dyer, Doppelt, Milbrath & Gilchrist, P.A.

(57) ABSTRACT

A method to manufacture native soil flowable fill includes hydro excavating native soil to form a hole at a first excavation, and transferring the native soil from the first excavation to a mixing tank. The method also includes adding a pozzolan component, cement and water to the mixing tank, mixing the native soil in the mixing tank with the added pozzolan component, cement and water to form the native soil flowable fill, and transferring the native soil flowable fill back to the first excavation and into the hole.

18 Claims, 4 Drawing Sheets

(51) Int. Cl.
  *B01F 15/00* (2006.01)
  *B01F 7/00* (2006.01)
  *B01F 7/20* (2006.01)
  *B01F 3/12* (2006.01)
  *C04B 28/02* (2006.01)
  *E02D 3/12* (2006.01)
  *C04B 111/00* (2006.01)

(56) References Cited

U.S. PATENT DOCUMENTS

| | | | | |
|---|---|---|---|---|
| 4,050,950 A | * | 9/1977 | Brewer | C04B 18/08 106/706 |
| 4,134,862 A | * | 1/1979 | Eden | C09K 17/22 205/735 |
| 4,329,090 A | * | 5/1982 | Teague | C09K 17/06 106/900 |
| 4,844,807 A | * | 7/1989 | Manchak, Jr. | B09B 1/00 175/50 |
| 5,106,422 A | * | 4/1992 | Bennett | C04B 28/021 106/705 |
| 5,535,836 A | * | 7/1996 | Cagianut | E21B 7/18 166/222 |
| 5,887,667 A | * | 3/1999 | Van Zante | E02F 5/003 175/218 |
| 5,951,751 A | | 9/1999 | Williams et al. | |
| 6,000,151 A | * | 12/1999 | Hayes | E02F 3/9206 175/67 |
| 6,042,305 A | * | 3/2000 | Novich | C09K 17/40 106/900 |
| 6,470,605 B1 | * | 10/2002 | Gilman | E02F 3/8816 37/323 |
| 6,484,422 B1 | * | 11/2002 | Bain | E02F 3/8825 37/323 |
| 6,615,849 B1 | * | 9/2003 | Gilman | E02F 3/8816 134/167 R |
| 7,234,252 B2 | * | 6/2007 | Jarnecke | E02F 3/925 175/67 |
| 7,344,592 B2 | | 3/2008 | Setliff et al. | |
| 7,381,177 B2 | | 6/2008 | Johnson et al. | |
| 7,484,322 B2 | * | 2/2009 | Maybury, Jr. | E02F 3/8816 175/66 |
| 7,581,903 B1 | * | 9/2009 | Scola | E02D 19/14 405/157 |
| 7,743,537 B2 | * | 6/2010 | Maybury, Jr. | E02F 3/8816 37/323 |
| 8,336,231 B2 | * | 12/2012 | Maybury, Jr. | E02F 3/8816 175/66 |
| 8,360,260 B2 | * | 1/2013 | Maybury, Jr. | E02F 3/8816 220/211 |
| 9,103,091 B2 | * | 8/2015 | Buckner | E02F 7/02 |
| 2006/0086010 A1 | | 4/2006 | Jarnecke et al. | |
| 2006/0117612 A1 | | 6/2006 | Maybury, Jr. et al. | |
| 2009/0185865 A1 | * | 7/2009 | Sharp | F16L 55/18 405/157 |
| 2010/0196104 A1 | * | 8/2010 | Constantz | C04B 28/04 405/302.4 |
| 2013/0340297 A1 | * | 12/2013 | Buckner | E02F 3/8816 37/304 |
| 2014/0020268 A1 | | 1/2014 | Buckner | |

* cited by examiner

FIG. 1
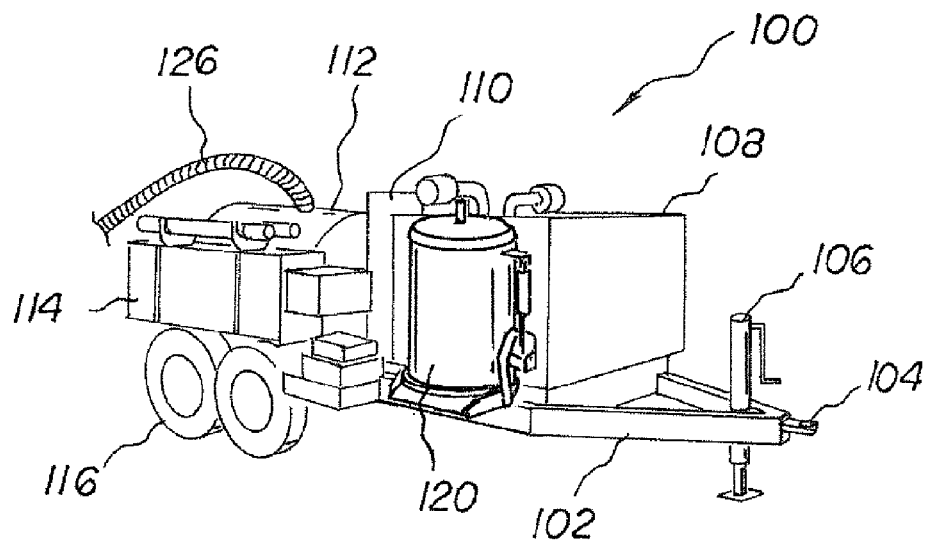
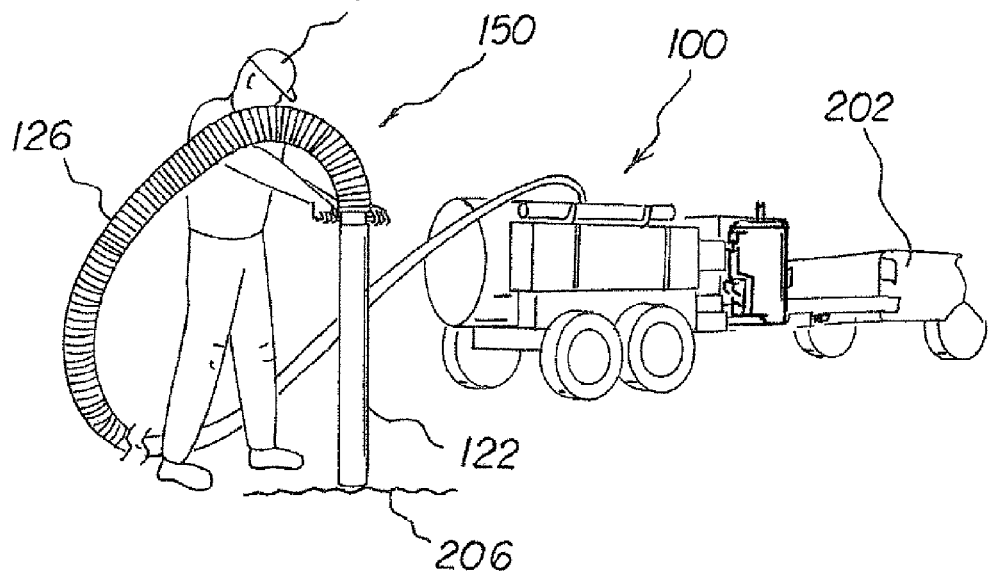
FIG. 2

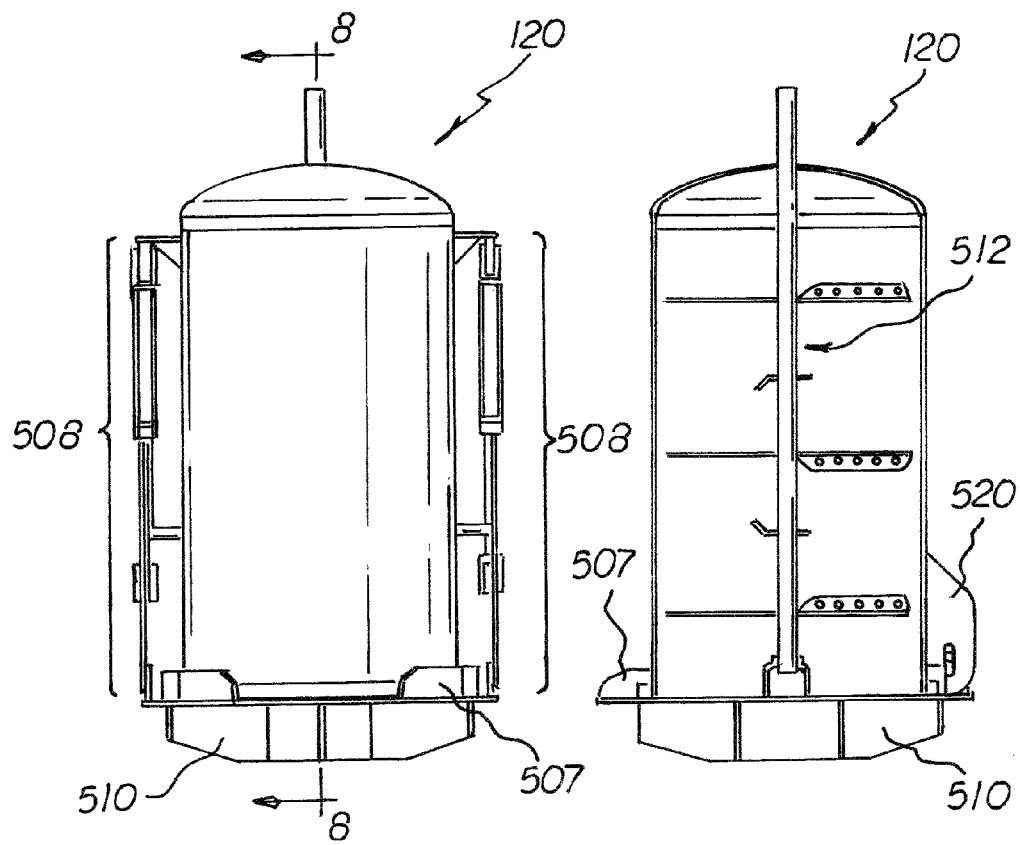
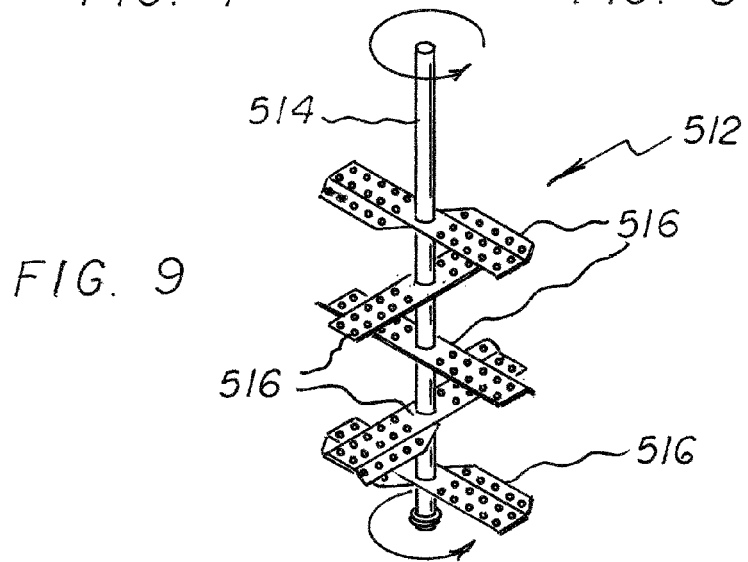

METHOD AND SYSTEM TO MANUFACTURE NATIVE SOIL FLOWABLE FILL

I. FIELD

The present invention relates in general to a method and system to manufacture native soil flowable fill.

II. DESCRIPTION OF RELATED ART

Industrial vacuum equipment has dozens of wet and dry uses such as locating underground utilities (potholing), hydro-excavation, air excavation and vacuum excavation. In addition, the equipment can be used for directional drilling slurry removal, industrial clean-up, waste clean-up, lateral and storm drain clean-out, oil spill clean-up and other natural disaster clean-up applications.

In particular, hydro excavation applications use a combination of high pressure water and suction to dig a hole and vacuum the soil and water into a tank. The hydro excavation equipment may be mounted to a truck or trailer and is typically powered by gas or diesel engines. The native soil that is removed during hydro excavation is typically hauled away for disposal. Dry fill materials are then hauled back to the job site to back fill the hole and are compacted in place. The hauling of the native soil away from the job site and hauling new dry material back to the job site for compaction adds time and costs to the project. Accordingly, what is needed is a method and system to re-use native soils on-site in order to reduce time and costs during construction.

However, in view of the prior art at the time the present invention was made, it was not obvious to those of ordinary skill in the pertinent art how the identified needs could be fulfilled.

III. SUMMARY

A method and system to manufacture native soil flowable fill is disclosed. In a particular embodiment, the method includes hydro excavating native soil to form a trench at a first excavation, and transferring the native soil from the first excavation to a mixing tank. The method also includes adding a pozzolan component, cement and water to the mixing tank, mixing the native soil in the mixing tank with the added pozzolan component, cement and water, to form the native soil flowable fill, and transferring the native soil flowable fill back to the first excavation and into the trench. The native soil flowable fill may include 30-90% by weight of native soil, 0-50% by weight of the added pozzolan component, 0-50% by weight of the cement, and 10-45% by weight of the water. In addition, an amount, by weight, of the added pozzolan component added to the native soil flowable fill may be a function of an amount, by weight, of siliceous material present in the native soil transferred to the mixing tank. Also, an amount, by weight, of the water added to the native soil flowable fill may be a function of an amount, by weight, of water present with the native soil when transferred to the mixing tank. The hydro excavation of the native soil may include using pressurized water to dislodge the native soil, and using a vacuum hose with suction to excavate the native soil and the water from the trench to the mixing tank. Further, the first excavation may be defined by a geographic physical area where the native soil has the substantially same amount of the pozzolan component by weight, per volume of native soil.

In another particular illustrative embodiment, a system to manufacture native soil flowable fill is disclosed. The system includes a water pump, a water hose coupled to the water pump, and a nozzle coupled to the water hose and configured to generate a jet of water. The system also includes a vacuum pump, a suction wand having a suction hose coupled to the vacuum pump and configured to remove native soil from a first location to form a trench, and a collection tank coupled to the suction hose. In addition, the system includes a mixing tank in fluid communication with the collection tank and configured to mix the native soil with additional components to form the native soil flowable fill. The mixing tank may also include a plurality of paddles for mixing, and a hydraulic latch secured to the mixing tank and configured to open a bottom of the mixing tank. Further, the bottom of the mixing tank may be hingedly connected to the mixing tank, and include a tray extending outwards from the bottom in order to direct the native soil flowable fill from the bottom as the bottom is opened downwardly. The system may also include the native soil flowable fill, where the native soil flowable fill includes the native soil, and an added pozzolan component, cement and water. The native soil flowable fill may include 30-90% by weight of the native soil, 0-50% by weight of the added pozzolan component, 0-50% by weight of the cement, and 10-45% by weight of the water. In addition, an amount, by weight, of the added pozzolan component added to the native soil to form the native soil flowable fill, may be a function of an amount by weight of siliceous material present in the native soil, and an amount, by weight, of the water added to form the native soil flowable fill, may be a function of an amount by weight of water present with the native soil.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

FIG. 1 is an elevational view of particular embodiment of the system to manufacture native soil flowable fill;

FIG. 2 is a perspective view of a trailer and associated equipment that may be used with a particular embodiment of the system to manufacture native soil flowable fill;

FIG. 7 is an elevational view of the mixing tank;

FIG. 8 is a sectional view taken on line 8-8 of FIG. 7 of the mixing tank, showing the mixing paddles; and FIG. 9 is a perspective view of the mixing paddles shown in FIG. 8.

V. DETAILED DESCRIPTION

Figures 3, 4:
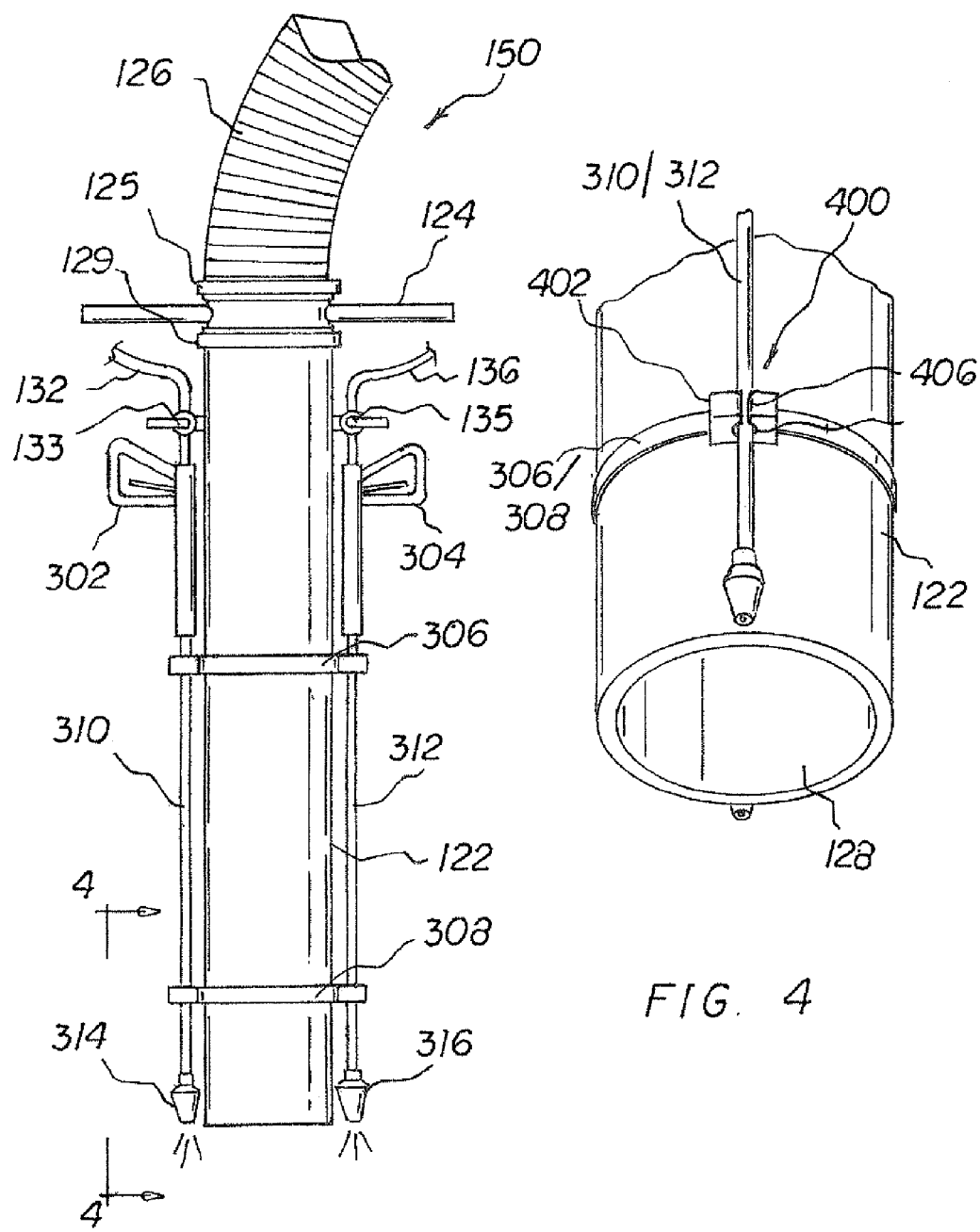
FIG. 3 is an elevational view of a suction wand that may used with a particular embodiment of the system to manufacture native soil flowable fill.
FIG. 4 is a perspective view of an open end of the suction wand shown in FIG. 3.
Figure 5:
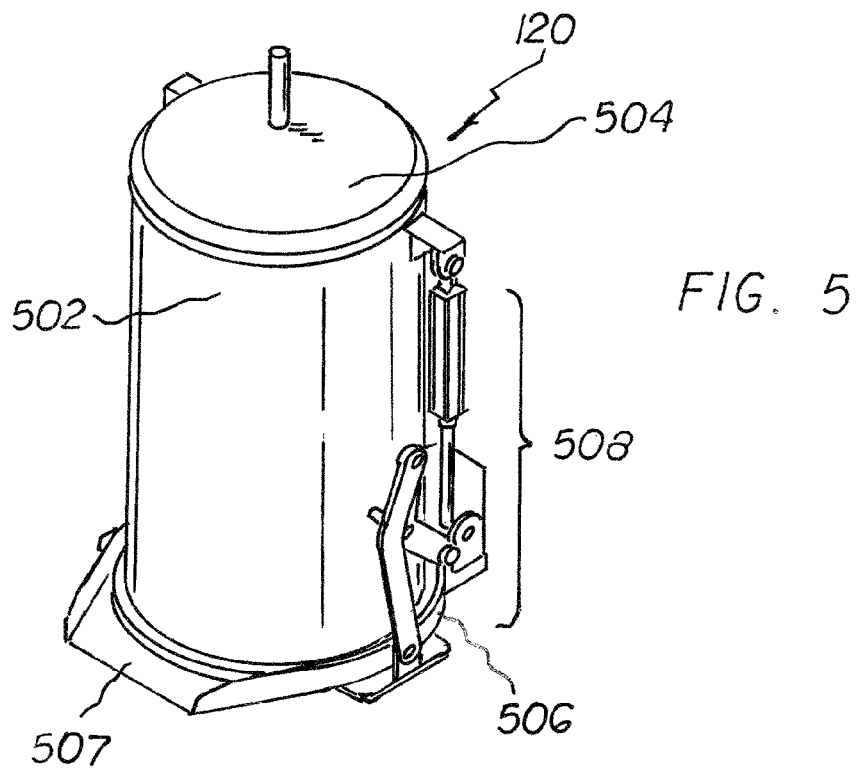
FIG. 5 is a top perspective view of a mixing tank that may be used to mix the native soil flowable fill.
Figure 6:
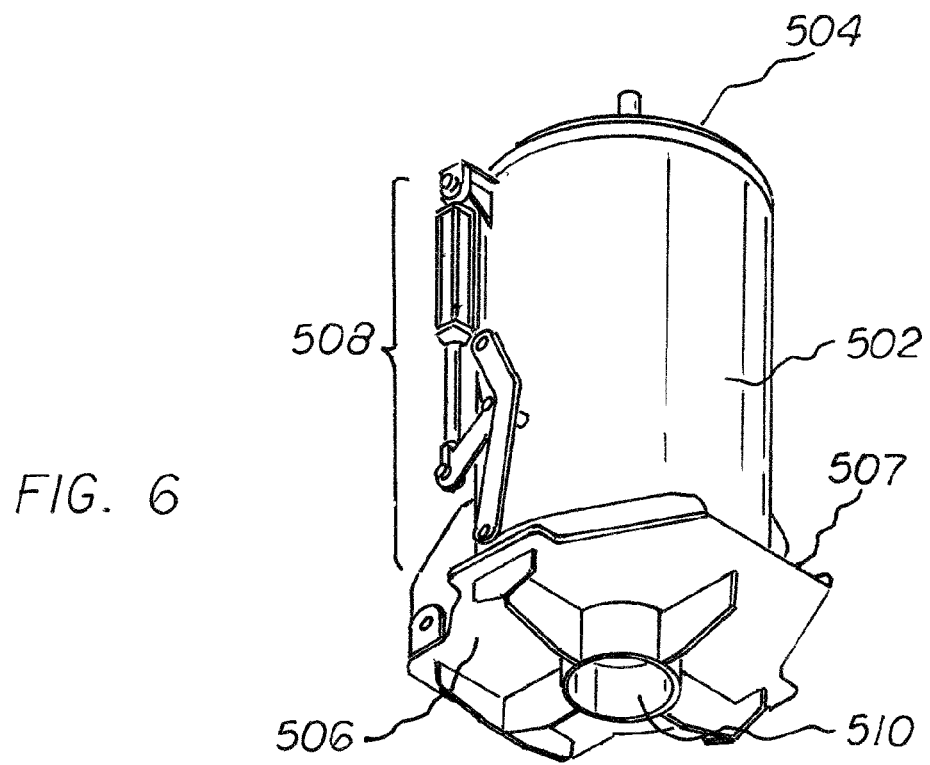
FIG. 6 is a bottom perspective view of the mixing tank shown in FIG. 5.

The word "exemplary" is used herein to mean "serving as an example, instance, or illustration." Any embodiment or design described herein as "exemplary" is not necessarily to be construed as preferred or advantageous over other embodiments or designs.

In a particular exemplary embodiment, the native soil flowable fill product includes a cement component and an aggregate component of native soils that are mixed with water in a sufficient amount. This provides a cement-based material in a flowable state that can be set in a controlled manner. The flowable fill is self compacting and has a flowable consistency. The homogenous mixing also facilitates control of the set time of the flowable fill product. The flowable fill can be effectively utilized as a fill material in a variety of different applications such as trench backfill, erosion control, pipe bedding, subbase stabilization, sinkhole fills, confined spaces, and other suitable areas.

The native soil flowable fill is non-corrosive to pipes and poles that may be encased in the flowable fill. The native soil flowable fill may include a cement component, an aggregate of native soils, other aggregates, water, or any combination thereof, in order to control the desired characteristics of the flowable fill. The cement component may include Portland cement and other materials such as kiln dust, fly ash, or other (natural and artificial) pozzolana materials. The additional cement components may be derived from any suitable materials and in any suitable manner. For example, the kiln dust can be derived from the manufacture of Portland cement. The aggregate component is made with the native soils that are excavated on the job site. Additional aggregates may also be added to the flowable fill that can include recycled materials or reclaimed materials, for example. The water component may include potable water, reclaimed water, or water from a naturally occurring water source proximate the job site, such as a pond or stream.

In a particular exemplary embodiment, a chemical agent may also be used to promote fast and effective set characteristics. The chemical agent can include any suitable type of material.

The cement and aggregate components of the present invention are mixed and further processed in a sufficient amount of water such that the desired mechanical properties, strength properties and the like can be achieved. The cement and aggregate components once processed form a liquid and flowable state. After a desired period of time, the flowable state can set to a settable state in a controlled manner. The native soil flowable fill is self compacting and may be used as a backfill or structural fill in lieu of compacted fill. The set product may be readily excavated with conventional hand-held digging tools.

In a particular exemplary embodiment, the aggregate component includes native soil that is excavated to form a trench, for example. The native soil is transferred from the first excavation to a debris tank or to a mixing tank. Typically, a vacuum pump is used to provide suction to a hose in order to transfer the native soil to the mixing tank. If high pressure water is used in the excavation (i.e., hydro excavation), then both the water remaining from performing the excavation and the native soil are vacuumed up under suction. Once the native soil (and water) are in the mixing tank, a pozzolan component, cement and additional water may be added to the mixing tank and mixed together to form the native soil flowable fill, which may then be transferred back to the first excavation and into the trench, for example.

The native soil flowable fill may include 30-90% by weight of native soil, 0-50% by weight of the added pozzolan component, 0-50% by weight of the cement, and 10-45% by weight of the water, in a particular embodiment. In addition, an amount, by weight, of the added pozzolan component added to the native soil flowable fill may be a function of an amount, by weight, of siliceous material present in the native soil when transferred to the mixing tank. For example, in some geographic areas, natural pozzolanas (e.g., siliceous material) may be present in the native soil. Accordingly, less of an additional pozzolan component is required for the flowable fill as the native soil contains material that acts as a natural pozzolan. Alternatively, more additional pozzolan component may be required where there may be little to no natural pozzolan present in the native soil. Similarly, the amount, by weight, of the cement added to the native soil flowable fill may be a function of an amount, by weight, of sand present in the native soil per volume when transferred to the mixing tank. Thus, more sand that is present in the native soil, the less cement that is required for the native soil flowable fill, and the less sand present in the native soil may require more cement for the native soil flowable fill.

Also, an amount, by weight, of the water added to the native soil flowable fill may be a function of an amount, by weight, of water present with the native soil when transferred to the mixing tank. In particular, when the hydro excavation of the native soil includes using pressurized water to dislodge the native soil, then less additional water is required to be added for the native soil flowable fill. The hydro excavation is performed using a vacuum hose with suction to excavate the native soil and the water (e.g., a slurry) from the trench to the mixing tank. When the excavating is performed without pressurized water, then more water is required to be added to form the native soil flowable fill.

Further, the first excavation may be defined by a geographic physical area where the native soil has the substantially same amount of the pozzolan component by weight, per volume of native soil. For example, the native soil flowable fill may be used throughout the same geographical area where the pozzolan component is substantially the same. However, the native soil flowable fill is preferably not transported to a second area where the pozzolan component, by weight, per volume of native soil, is substantially different from the area of the first excavation.

In a particular exemplary embodiment of the system to produce native soil flowable fill, a trailer 100 similar to that shown in FIGS. 1 and 2 may be used to mount the various excavation and mixing equipment. The trailer 100 includes a frame 102 on wheels 116, where the trailer 100 may have a hitch 104 that may be connected to a vehicle 202 for towing to the excavation site. An adjustable jack 106 is used to stabilize the trailer 100 when disconnected from the vehicle 202. A gasoline or diesel engine 108 may be mounted to the frame 102 and used to power the vacuum equipment, hydraulic pumps, pneumatic pumps, mixer, or any combination thereof. The suction hose 126 is connected to the collection tank 112, which is connected to a filter 110. A water tank 114 may be used to transport water to the site to supply the pressurized water and mixing water for the flowable fill as explained above. In operation, the user 204 grasps the suction wand 122 and applies downward pressure to the ground 206. The suction hose 126 vacuums the native soils 206 from the excavation to the collection tank 112. The user 204 may adjust the pressurized air water lines as needed to break up and loosen the soil 206 for excavation.

The water lines 132, 136 may be removably secured to the exterior surface of the suction wand 122 as illustrated in FIGS. 3 and 4. Accordingly, the user 204 can remove the water lines 132, 136 and attach standard pressure wands 302, 304, for example. The pressure wands 302, 304 may be detachably secured to the exterior of the suction wand 122, so the pressure wands 302, 304 may be used as part of the suction wand 122 or removed and used separately as needed.

This feature provides the flexibility to access different portions of the excavation. A pair of bands 306, 308 may be secured around the suction wand 122 and used to support the equipment related to the wands 302, 304.

Each pressure wand 302, 304 may be connected to the respective valve 133, 135 in order to control the pressurized water flow to the respective conduit 310, 312 and nozzle 314, 316. A handle of the respective pressure wand 302, 304 may include a trigger mechanism in addition to the respective valve 133, 135 to control the flow. Referring now to FIG. 4, a bracket 400 may be mounted to an exterior surface of the suction wand 122. The bracket includes a base 402 having an aperture 404 for receiving the conduit 310. A gap 406 at the front of the base 402 allows the conduit 310 to snap into the bracket 400 and also to be removed by pulling the conduit 310 outward from the bracket 400 through the gap 406. In addition, standard piping may be substituted for the pressure wands 302,304, and mounted in conventional fashion to the exterior of the suction wand 122 and terminate in nozzles 314 and 316 to direct a jet flow adjacent to the suction wand 122.

The suction wand 122 is used to remove the shiny of native soils 206 and water from the excavation site via the suction hose 126. The suction hose 126 is in fluid communication with the collection tank 112. The slurry of native soil and water is transferred to the mixing tank 120, which is in fluid communication with the collection tank 112, and mixed with cement, a pozzolan component, and/or water in the mixing tank 120 to produce a native soil flowable fill with a desired consistency. The flowable fill may be pumped out of the mixing tank 120 and to the excavation site, or the exit end (e.g., bottom) of the mixing tank 120 may be opened to allow the flowable fill to be directed into a wheelbarrow or chute, for example. Alternatively, the mixing tank 120 may be moved over the excavation to drop the flowable fill into the trench or hole without secondary handling of the flowable fill.

Referring now to FIGS. 5-9, the mixing tank 120 includes a cylindrical wail 502 with a top 504 and bottom 506. The bottom 506 may be hingedly connected to the mixing tank 120 and opened using a hydraulic latch system 508. The bottom 506 may have a tray 507 that extends outwards from the mixing tank 120. The tray 507 is used to direct the flowable fill into a wheelbarrow or chute as the bottom 506 is opened downwardly. The bottom 506 may include structural support ribs 510.

As best illustrated in FIG. 7, the hydraulic latch system 508 includes a hydraulic ram disposed on each opposing side of the mixing tank 120. The hydraulic latch system 508 is used to control the opening motion of the bottom 506 in order to control the flow rate of the flowable fill as it flows out of the mixing tank 120.

The mixing tank 120 includes a mixing apparatus 512. In a particular exemplary embodiment, a plurality of mixing paddles 516 are mounted to a center axle 514 within the mixing tank 120 and are positioned from a bottom portion of the mixing tank 120 to a top portion of the mixing tank 120. The mixing paddles 516 rotate inside the mixing tank 120 to mix the cement, native soil, pozzolan component, and water to form the native soil flowable fill. The spacing and distribution of the mixing paddles 516 within the mixing tank 120 enables the flowable fill to be thoroughly mixed. In addition, the collection tank 120 may be used as the mixing tank 120 instead of providing a separate mixing tank 120. Accordingly, the mixing apparatus 512 may be integrated directly into the collection tank 112, and may be in a horizontal (or vertical) configuration, for example.

The previous description of the disclosed embodiments is provided to enable any person skilled in the art to make or use the disclosed embodiments. A particular advantage of the method and system to manufacture the native soil flowable fill, is that the soil that is excavated is also used to manufacture the flowable fill that is used as the fill at the same location. Accordingly, the characteristics of the native soil flowable fill will be more compatible to the surrounding environment of the excavation location.

Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features.

What is claimed is:

1. A system to manufacture a native soil flowable fill, the system comprising:
   a water pump;
   a water hose coupled to the water pump;
   a nozzle coupled to the water hose and configured to generate a jet of water;
   a vacuum pump;
   a suction wand having a suction hose coupled to the vacuum pump and configured to remove native soil from a first location to form a hole;
   a collection tank coupled to the suction hose; and
   a mixing tank in fluid communication with the collection tank and configured to mix the native soil with additional components to form the native soil flowable fill, wherein a bottom of the mixing tank being hingedly connected thereto, and having a tray extending outwards from the bottom in order to direct the native soil flowable fill into a container or the excavation site as the bottom is opened downwardly.

2. The system of claim 1, wherein the mixing tank further comprises a plurality of paddles for mixing.

3. The system of claim 2, wherein the mixing tank further comprises a hydraulic latch secured to the mixing tank and configured to open the bottom of the mixing tank.

4. The system of claim 1, wherein the mixing tank further comprises the native soil, an added pozzolan component, cement and water, which are contained therein.

5. The system of claim 4, wherein the native soil flowable fill comprises 30-90% by weight of the native soil, 0-50% by weight of the added pozzolan component, 0-50% by weight of the cement, and 10-45% by weight of the water.

6. The system of claim 5, wherein an amount, by weight, of the added pozzolan component added to the native soil to form the native soil flowable fill comprises a function of an amount by weight of siliceous material present in the native soil.

7. The system of claim 5, wherein an amount, by weight, of the water added to the native soil flowable fill comprises a function of an amount by weight of water present with the native soil.

8. A method to manufacture a native soil flowable fill, the method comprising:
   removing native soil from a first excavation;
   transferring the native soil from the first location to a mixing tank having a bottom hingedly connected thereto and a tray extending outwards from the bottom;
   adding a pozzolan component, cement and water to the mixing tank;

mixing the native soil in the mixing tank with the added pozzolan component, cement, and water to form the native soil flowable fill;

transferring the native soil flowable fill from the mixing tank to the excavation; and filling the first excavation with the native soil flowable fill.

9. The method of claim 8, wherein an amount, by weight, of the added pozzolan component added to the native soil flowable fill comprises a function of an amount, by weight, of siliceous material present in the native soil when transferred to the mixing tank.

10. The method of claim 8, wherein an amount, by weight, of the water added to the native soil flowable fill is a function of an amount, by weight, of water present with the native soil when transferred to the mixing tank.

11. The method of claim 8, wherein the pozzolan component comprises fly ash.

12. The method of claim 8, wherein the pozzolan component comprises a natural pozzolana material.

13. The method of claim 8, wherein an amount, by weight, of the cement added to the native soil flowable fill comprises a function of an amount, by weight, of sand present in the native soil when transferred to the mixing tank.

14. A system to manufacture a native soil flowable fill, the system comprising:

a suction hose configured to remove native soil from a first location;

a collection tank coupled to the suction hose; and a mixing tank having a bottom hingedly connected thereto and a tray extending outwards from the bottom, the mixing tank in fluid communication with the collection tank and configured to mix the native soil with additional components to form the native soil flowable fill.

15. The system of claim 14, wherein the mixing tank further comprises a plurality of paddles for mixing.

16. The system of claim 14, wherein the mixing tank further comprises a hydraulic latch secured to the mixing tank and configured to open the bottom of the mixing tank.

17. The system of claim 14, wherein the additional components comprise a pozzolan component, cement, and water.

18. The system of claim 17, wherein the native soil flowable fill comprises 30-90% by weight of the native soil, 0-50% by weight of the pozzolan component, 0-50% by weight of the cement, and 10-45% by weight of the water.

* * * * *